United States Patent [19]

Stol

[11] Patent Number: 4,547,654
[45] Date of Patent: Oct. 15, 1985

[54] METHOD AND APPARATUS FOR ARC WELDING

[75] Inventor: Israel Stol, Monroeville, Pa.

[73] Assignee: Westinghouse Electric Corp., Pittsburgh, Pa.

[21] Appl. No.: 573,171

[22] Filed: Jan. 23, 1984

Related U.S. Application Data

[62] Division of Ser. No. 321,156, Nov. 13, 1981.

[51] Int. Cl.[4] .............................................. B23K 9/12
[52] U.S. Cl. ........................... 219/137 PS; 219/137.2; 219/136
[58] Field of Search ............. 219/137 R, 137 PS, 136, 219/137.2, 76.15, 130.01, 137.61

[56] References Cited

U.S. PATENT DOCUMENTS

| | | | |
|---|---|---|---|
| 2,847,555 | 8/1958 | Yenni | 219/76.15 |
| 3,274,371 | 9/1966 | Manz et al. | 219/76.15 X |
| 3,600,549 | 8/1971 | Olshansky | 219/137 R |

FOREIGN PATENT DOCUMENTS

| | | |
|---|---|---|
| 2228701 | 12/1972 | Fed. Rep. of Germany . |
| 2619306 | 11/1976 | Fed. Rep. of Germany . |
| 14082 | 2/1981 | Japan .................................. 219/137.2 |
| 323212 | 2/1972 | U.S.S.R. ............................ 219/137.2 |

Primary Examiner—Roy N. Envall, Jr.
Assistant Examiner—C. M. Sigda
Attorney, Agent, or Firm—Robert P. Lenart

[57] ABSTRACT

An arc welding process is provided with a preheating step in which a consumable wire electrode is heated prior to insertion into the electrode stick-out region. This is accomplished by the circulation of current from a preheating power supply through a segment of the wire. Both gas-metal and gas-tungsten arc welding processes are disclosed, along with apparatus used in these processes.

2 Claims, 4 Drawing Figures

METHOD AND APPARATUS FOR ARC WELDING

This is a division of application Ser. No. 321,156, filed Nov. 13, 1981.

BACKGROUND AND SUMMARY OF THE INVENTION

This invention relates to arc welding and more particularly to arc welding methods and apparatus in which the heat content of an alloyed wire being deposited and the associated wire feed rate are controlled independently of the welding and preheating currents.

In conventional gas-metal arc welding (GMAW) processes, heating of the alloyed wire prior to deposition is accomplished by passing welding current through a certain wire length, commonly referred to as the wire stick-out. The power consumed in heating this wire is equal to the product of the square of the welding current and the resistance of the wire ($I^2R$). In order to increase the wire deposition rate, the heat content of the wire is increased by increasing the electrical stick-out or the welding current or both.

Excessive wire stick-out leads to uncontrolled wire wandering and/or poor deposit quality. Therefore welding current is the predominant variable that determines deposition rate and mode of metal transfer through the arc. However, current intensification leads to more power dissipation in the arc. Since approximately 65 to 85% of the arc heat is conducted into the base metal, a higher current would increase arc penetration while increasing deposition rate and decreasing dilution. Although dilution can be reduced by employing higher welding current and slower speeds of travel, these means of control have practical limitations. Higher heat input per unit of length can generate excessive assembly distortion and metallurgical damage in both the deposit and base metal, such as heat affected zone (HAZ) underbed cracking and hot cracking.

In the conventional hot wire gas-tungsten arc welding (HWGTAW) process, heating of the alloyed wire prior to deposition is accomplished by passing a heating current through a certain length of wire stick-out. As in the GMAW process, higher wire heat content is adjusted by increasing wire stick-out or increasing heating current or both. This makes the HWGTAW process subject to similar difficulties experienced by the GMAW process. The present invention seeks to overcome these difficulties by preheating the wire remotely from the arc and molten pool, thereby reducing the required welding current and wire stick-out length.

The methods and apparatus of the present invention represent an improvement of prior art arc welding processes by providing for preheating of the alloyed wire prior to its entry into the stick-out region. In a gas-metal arc welding method where a power supply feeds welding current through a welding wire electrode into a metal workpiece, the present invention adds a preheating step whereby the wire heat content is increased by means other than the welding current. By increasing the heat content of the wire in this manner, a significant reduction in weld dilution is achieved. One means of preheating the wire is to pass current through a wire segment prior to the wire's entry into the stick-out region.

In a hot wire gas-tungsten arc welding process where an arc between a permanent tungsten electrode and the workpiece creates a pool of molten metal into which a heated welding wire is fed, again the present invention adds the step of preheating the wire. This limits the length of wire stick-out required to reach a desired wire temperature for a given current in the wire, thereby minimizing wire wandering, improving deposit quality and minimizing arc-wire interaction.

Welding apparatus in accordance with the present invention includes means for preheating welding wire such that wire heat content can be controlled independently of welding current or wire feed rate. This provides for improved control over prior art welding processes.

DETAILED DESCRIPTION OF THE PREFERRED EMBODIMENTS

Figure 1:
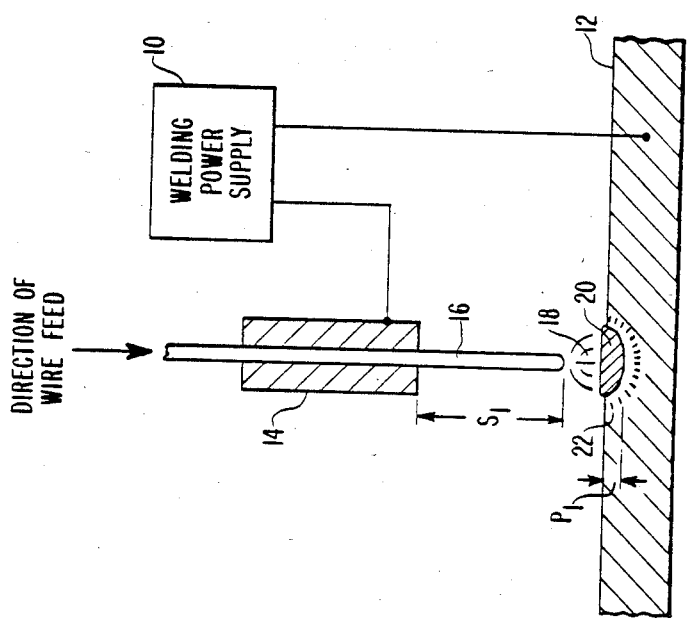
FIG. 1 shows a prior art gas-metal arc welding apparatus.

A clear presentation of the present invention can be achieved by first referring to the prior art gas-metal arc welding apparatus of FIG. 1. Direct current welding power supply 10 is connected between workpiece 12 and electrode contact tip 14. Welding wire 16 is a consumable electrode which is maintained in electrical contact with electrode contact tip 14 and fed by known feeding means toward workpiece 12. As consumable electrode 16 approaches workpiece 12, arc 18 is created and deposition of consumable electrode 16 begins. The penetration of weld 20 into workpiece 12 is designated as $P_1$. The heat affected zone 22 can be seen under weld 20.

In the gas-metal arc welding process as performed with the apparatus of FIG. 1, current passing through consumable electrode 16 over stick-out length $S_1$ acts to heat electrode 16 by dissipating power equivalent to the square of the welding current times the resistance of electrode ($I^2R$). Increasing the electrode heat content is accomplished by increasing welding current or by increasing stick-out length or both. These techniques can lead to poor deposit quality, excessive penetration and excessive electrode wandering.

Figure 2:
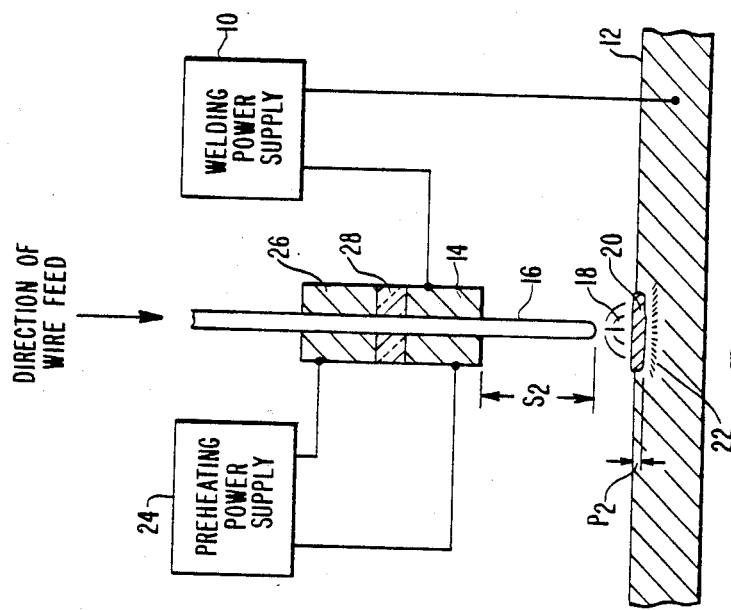
FIG. 2 shows an embodiment of a gas-metal arc welding apparatus in accordance with the present invention, representing an improvement of the apparatus of FIG. 1.

FIG. 2 shows a gas-metal arc welding apparatus in accordance with an embodiment of the present invention. Preheating power supply 24 is connected between electrode contact tips 14 and 26, which are separated by a dielectric material 28. When consumable electrode 16 is fed toward the workpiece by known feeding means and makes contact with contact tips 14 and 26, current flows through the segment of electrode located between these contact tips thereby preheating the electrode before it reaches the stick-out region $S_2$. It should be apparent to those skilled in the art that the amount of preheating can easily be adjusted independently of the feeding rate. Additional heating occurs in the stick-out region due to welding current through the electrode. However, less welding current will be needed to reach a given electrode temperature. In addition, the stick-out length can be reduced, thereby providing greater control of electrode position. These benefits are achieved in the present invention gas-metal arc welding process by adding a preheating step to the prior art process.

The use of this preheating step in the gas-metal arc welding process reduces the arc force and penetration, thereby reducing metallurgical damage and distortion of the weld assembly. Penetration $P_2$ and percent dilution are reduced while the range of controllable deposition rates increases. Larger diameter wires could be used to achieve enhanced deposition rates and wire rigidity with a smaller increase in welding current than required by a prior art GMAW process.

Preheating the wire segment would also bake out part of the volatile contaminants adhering to the wire's surface, such as moisture and drawing compounds. This would occur away from the gas shielding cone, thus reducing the potential disruption of arc stability and the solution of detrimental constituents, such as hydrogen, by the molten pool.

Preheating also promotes ready transfer to the spray metal transfer mode and reduces spatter. The use of multiple preheated wires can result in a high productivity cladding process.

Figure 3:
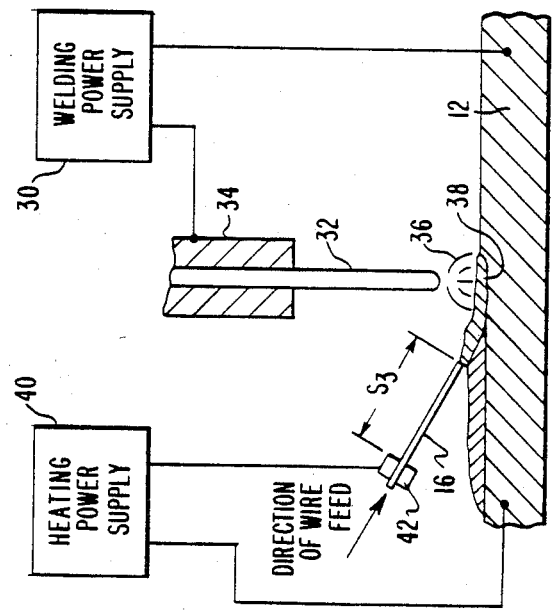
FIG. 3 shows a prior art gas-tungsten arc welding apparatus.

FIG. 3 shows a prior art hot wire gas-tungsten arc welding apparatus in which a direct current welding power supply 30 is connected to a nonconsumable electrode 32, via a contact tip 34, and a workpiece 12. An arc 36 between electrode 32 and workpiece 12 creates a molten pool of metal 38 on the surface of workpiece 12. Heating power supply 40 is connected between consumable electrode contact tip 42 and workpiece 12. When consumable electrode 16 is fed into molten pool 38 while maintaining contact with electrode contact tip 42, current flows through stick-out segment $S_3$, thereby heating consumable electrode 16. As in the GMAW process, heat content of the consumable electrode is controlled by controlling electrode current or electrode stick-out length or both. The range of deposition rates in the prior art hot wire GTAW process is restricted by the limited rigidity of consumable electrode in the stick-out region and by electromagnetic art deflection by the heating current when it approaches approximately 40% of the magnitude of the welding current.

Figure 4:
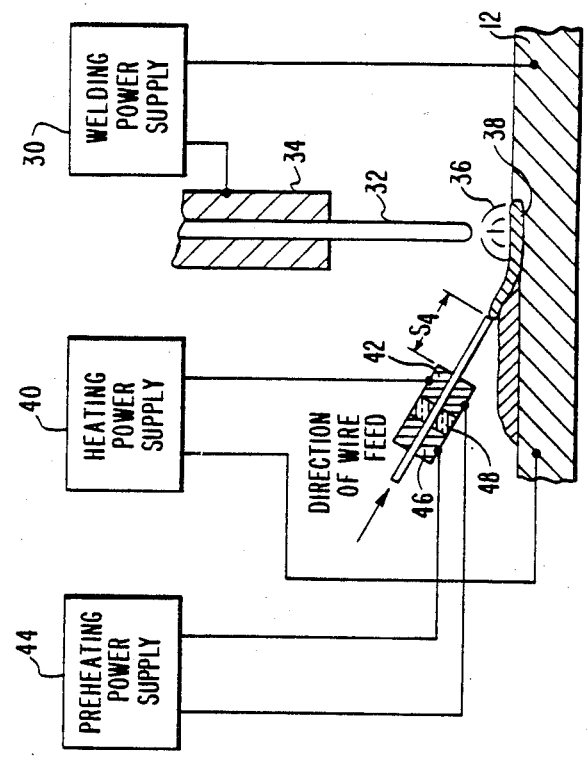
FIG. 4 shows an embodiment of a gas-tungsten arc welding apparatus in accordance with the present invention, representing an improvement of the apparatus of FIG. 3.

FIG. 4 shows a gas-tungsten arc welding apparatus in accordance with the present invention. Preheating power supply 44 is connected to electrode contact tips 42 and 46 which are separated by a dielectric material 48. When consumable electrode 16 makes contact with electrode contact tips 42 and 46, current flows through the segment of electrode located between these contact tips, thereby preheating the electrode before it reaches stick-out region $S_4$. The use of a preheating step in this process allows for shorter wire stick-out and enhanced wire rigidity at any given deposition rate, thereby providing a broadened range of deposition rates. Shorter wire stickout and enhanced rigidity also make wire position adjustment, wire wandering, and wire straightening less critical. Current in the wire preheating segment can be adjusted to compensate for reduced heating from the prior art heating current due to the reduced stick-out length.

Preheating power supply 44 can utilize either alternating or direct current to supply the required wire heating. Since the preheating current flows remotely from the molten pool 38 and welding arc 36, its magnitude has no effect on electromagnetic arc deflection. The use of a preheating step in the present invention provides the additional advantage that alloys with low electrical resistivities, such as copper or aluminum, can be deposited by the hot wire GTAW process. Without preheating, electromagnetic arc deflection occurs when the required magnitude of AC heating current is achieved.

In order to further illustrate the invention, the calculated effects of adding a preheating step to a solid wire GMAW process can be shown. Using a carbon steel welding alloy with a wire diameter of 0.045 inch, a wire feed rate of 310 inches per minute, and a stick-out of 0.75 inch, the welding current is 235 amperes and the voltage drop across the arc and wire is 26 volts. In a prior art apparatus as shown in FIG. 1, the power delivered to the wire stick-out amounts to 84.78% of the power required to melt the wire. This corresponds to an average wire temperature of 347° C.

By adding a preheating step, the power used to preheat the wire can be set at 80% of the melting power and the wire stick-out can be reduced to 0.5 inch, thereby improving wire rigidity. In order to achieve a wire temperature of 347° C. in the preheated wire segment with 80% of the melting power supplied, the preheating power supply must deliver 4 volts and 278 amperes across the preheated wire segment.

Without preheating, the total power dissipation in the arc and heating is 6110 watts. With 80% of the melting power supplied by a preheater power supply, the power dissipated in the arc becomes 4991 watts. The conventional GMAW process would require a welding current of 235 amperes to support an 8.48 pound per hour deposition rate, while only 119 amperes of welding current would be required for the same deposition rate when a preheating power supply supplies 80% of the wire melting power.

The consumable electrode contacts would have to be cooled in such a system to prevent overheating. However, this would not adversely affect the heat content of the wire since the contact area between the hot wire and contact tip is small, wire feed rates override wire cooling rates, and thermal resistance between the wire and the contact tip is high.

The benefits of this invention have been demonstrated in a gas-metal arc welding process where the consumable electrode was an Inconel 82 wire, one-sixteenth of an inch in diameter, which was fed toward a workpiece at a rate of 260 inches per minute, with a wire stick-out length of 1.5 inches. Using a conventional welding process, as represented by FIG. 1, a welding current of 300 DC amperes with a voltage across the wire and arc equal to 35 volts, resulted in a weld with an average dilution of 33% and an iron content of 15%.

When the process was modified in accordance with the present invention, as represented by FIG. 2, the preheating power supply provided 162 amperes of alternating current to preheat the wire. Then a welding current of 210 DC amperes and a voltage across the wire and arc of 29 volts produced a weld with an average dilution of 4.5% and an iron content of 2%, where 1% iron came from the filler wire.

Along with this significant reduction in dilution, welds made in accordance with this invention exhibit improved tie-in properties. In addition, the use of a lower welding current allows the use of a smaller welding torch, thereby increasing the versatility of welding apparatus which utilizes this invention. Although the preheating step of these examples was accomplished by passing an electric current through a segment of the consumable electrode, it should be apparent that other means of preheating also fall within the scope of this invention.

What is claimed is:

1. An arc welding process comprising the steps of:

creating a molten pool of metal on a workpiece to be welded by connecting a first power source between a nonconsumable electrode and said workpiece to create an arc between said non-consumable electrode and said workpiece;

connecting a second power source between a first electrode contact tip and said workpiece;

feeding a consumable electrode into said molten pool, while maintaining sliding contact with said first electrode contact tip; and passing a preheating current through a fixed length of said consumable electrode before it leaves contact with said first electrode contact tip by connecting a third power source between a second electrode contact tip and said first electrode contact tip, wherein said first and second electrode contact tips are separated by a dielectric element and said consumable electrode passes through an opening in said dielectric element such that said dielectric element prevents lateral movement of said consumable electrode.

2. An apparatus for welding a metal workpiece which comprises:

a non-consumable electrode;

a first source of electric power connected between said non-consumable electrode and the workpiece, thereby creating an arc between said non-consumable electrode and said workpiece to establish a molten pool of metal on the workpiece;

a second source of electric power connected between a first electrode contact tip and the workpiece;

a third source of electric power connected between said first electrode contact tip and a second electrode contact tip wherein said first and second electrode contact tips are separated by a fixed distance;

a consumable electrode slidably disposed between said electrode contact tips;

a dielectric element between said electrode contact tips, said dielectric element having an opening through which said consumable electrode passes, thereby preventing lateral movement of said consumable electrode; and means for advancing said consumable electrode toward said molten pool of metal.

* * * * *